United States Patent
Seay

(10) Patent No.: US 6,550,179 B1
(45) Date of Patent: Apr. 22, 2003

(54) MAGNETIC LOCK FISHING FLOAT

(76) Inventor: Robert C. Seay, Box 161, Valley View, TX (US) 76272

( * ) Notice: Subject to any disclaimer, the term of this patent is extended or adjusted under 35 U.S.C. 154(b) by 0 days.

(21) Appl. No.: 10/138,814

(22) Filed: May 6, 2002

(51) Int. Cl.[7] .............................................. A01K 93/00
(52) U.S. Cl. ..................... 43/44.88; 43/44.91; 43/44.87
(58) Field of Search .............................. 43/44.88, 44.91, 43/44.9, 44.87, 42.23

(56) References Cited

U.S. PATENT DOCUMENTS

| | | | | |
|---|---|---|---|---|
| 250,848 A | * | 12/1881 | Smith ........................ | 43/44.88 |
| 2,208,240 A | * | 7/1940 | Arnesen et al. ............ | 43/44.88 |
| 2,281,204 A | * | 4/1942 | Raymond ................... | 139/212 |
| 2,293,294 A | * | 8/1942 | Heckman ................... | 43/44.88 |
| 2,376,958 A | * | 5/1945 | Chapman ................... | 43/44.88 |
| 2,496,334 A | * | 2/1950 | Chapman ................... | 43/44.88 |
| 2,503,793 A | * | 4/1950 | Breemes .................... | 43/44.91 |
| 2,581,259 A | * | 1/1952 | Keen ......................... | 43/44.91 |
| 2,581,260 A | * | 1/1952 | Keen ......................... | 43/44.87 |
| 2,597,737 A | * | 5/1952 | Kay et al. .................. | 43/44.88 |
| 2,611,211 A | * | 9/1952 | Stockton .................... | 43/44.91 |
| 2,647,705 A | * | 8/1953 | Gilmore ..................... | 242/154 |
| 2,722,768 A | * | 11/1955 | Fleetwood ................. | 43/44.91 |
| 2,775,056 A | * | 12/1956 | Sneed ........................ | 43/44.91 |
| 2,937,469 A | * | 5/1960 | Tiede ......................... | 43/44.88 |
| 2,983,067 A | * | 5/1961 | Saywell, Jr. ............... | 43/44.88 |
| 2,984,040 A | * | 5/1961 | Fogaley ..................... | 43/44.91 |
| 3,032,913 A | * | 5/1962 | Voll ........................... | 43/44.91 |
| 3,106,034 A | * | 10/1963 | Jonassen .................... | 43/44.91 |
| 3,158,953 A | * | 12/1964 | Filler ......................... | 43/42.22 |
| 3,192,661 A | * | 7/1965 | Tyrrell ....................... | 43/44.88 |
| 3,353,294 A | * | 11/1967 | Mundorff et al. .......... | 43/44.88 |
| 3,370,376 A | * | 2/1968 | Winn ......................... | 43/44.88 |
| 3,381,407 A | * | 5/1968 | McDougall ................ | 43/44.88 |
| 3,443,336 A | * | 5/1969 | Reese ........................ | 43/44.88 |
| 3,455,056 A | * | 7/1969 | Cultrera .................... | 43/44.91 |
| 3,626,628 A | * | 12/1971 | Weimer ..................... | 43/42.22 |
| 3,659,372 A | * | 5/1972 | Cullen ....................... | 43/44.88 |
| 3,688,431 A | * | 9/1972 | Nichols et al. ............ | 43/44.88 |
| 3,750,324 A | * | 8/1973 | Verheij ...................... | 43/44.88 |
| 3,800,461 A | * | 4/1974 | Jacobi ....................... | 43/44.88 |
| 3,999,324 A | * | 12/1976 | Wagner ..................... | 43/44.91 |
| 4,030,223 A | | 6/1977 | Loesch | |
| 4,047,319 A | | 9/1977 | Duncan | |
| 4,195,435 A | | 4/1980 | Kern | |
| 4,571,874 A | * | 2/1986 | Smaw ........................ | 43/44.91 |
| 4,757,633 A | * | 7/1988 | Van Cleve ................. | 43/26.1 |
| 4,757,635 A | * | 7/1988 | Cole .......................... | 43/44.91 |
| 4,872,281 A | * | 10/1989 | Burgess ..................... | 43/43.12 |
| 4,905,401 A | * | 3/1990 | Fukumoto .................. | 43/43.12 |
| 5,117,576 A | * | 6/1992 | Lasiter ...................... | 43/44.91 |
| 5,177,894 A | * | 1/1993 | Dunsford ................... | 43/43.12 |
| 5,361,532 A | * | 11/1994 | Moff ......................... | 43/44.91 |
| 5,557,878 A | * | 9/1996 | Ross .......................... | 43/44.87 |
| 5,713,152 A | | 2/1998 | Domack | |

FOREIGN PATENT DOCUMENTS

| EP | 749272 B1 | * | 10/1998 |
| WO | WO-85/05249 B1 | * | 12/1985 |
| WO | WO-95/24123 B1 | * | 9/1995 |

* cited by examiner

Primary Examiner—Darren W. Ark
(74) Attorney, Agent, or Firm—Randal D. Homburg

(57) ABSTRACT

The invention relates to a fishing float having a magnetic lock mechanism within the float to allow for the adjustment of a fishing line through the float to adjust the length of the fishing line through the float to select the appropriate depth of the bait or lure below the fishing float without having to reel in the bait and adjust the depth from the shore. The float, once attached, is locking into place by a rocking magnetic lock wedge having an internal-non-magnetic metal ball inside the magnetic lock wedge to motivate the magnetic lock wedge either away from or towards a magnetic lock channel, capturing fishing line placed between the magnetic lock wedge and the magnetic lock channel, the lock wedge and the lock channel being magnetically attracted to each other.

3 Claims, 2 Drawing Sheets

MAGNETIC LOCK FISHING FLOAT

CROSS REFERENCE TO RELATED APPLICATIONS

BACKGROUND OF THE INVENTION

1. Field of Invention

The invention relates to a fishing float having a magnetic lock mechanism within the float to allow for the adjustment of a fishing line through the float to adjust the length of the fishing line through the float to select the appropriate depth of the bait or lure below the fishing float without having to reel in the bait and adjust the depth from the shore. The float, once attached, is locking into place by a rocking magnetic lock wedge having an internal non-magnetic metal ball inside the magnetic lock wedge to motivate the magnetic lock wedge either away from or towards a magnetic lock channel, capturing fishing line placed between the magnetic lock wedge and the magnetic lock channel, the lock wedge and the lock channel being magnetically attracted to each other.

2. Description of Prior Art

The following United States patents were discovered and are disclosed within this application for utility patent. All relate to fishing floats, with some having adjustable means within the float. In U.S. Pat. No. 5,361,532 to Moff, a fishing float is disclosed having a metal ball and a magnetic ring which allows for the bobber to be cast, then fill with water orienting the device in a vertical position causing the ball to travel to the end of a hollow tube within which it is situated, catching the fishing line run through the tube between the ball and the tube opening, locking the line into position.

Finger activated adjustable bobbers, knot adjustable bobbers, and snap-together adjustable bobbers are disclosed in respective U.S. Pat. No. 4,047,319 to Duncan, U.S. Pat. No. 4,195,435 to Kern and U.S. Pat. No. 5,713,152 to Domack, which have manual adjustment means. A remote adjustable means for a fishing bobber using a ball within a cylinder to trap the fishing line between the ball and the inner cylinder wall is disclosed in U.S. Pat. No. 5,117,576 to Lasiter. U.S. Pat. No. 4,030,223 to Loesch discloses an ice fishing line control apparatus that causes an arm to drop when the line has a bite or downward tug releasing a magnetically attached arm.

None of them provide the same elements as the current invention, which comprises a magnetic catch between two elements to retain a line, the magnetic catch being release and reactivated by minor tugs on the fishing line.

SUMMARY OF THE INVENTION

The primary objective of the invention is to provide a fishing bobber having an inner release mechanism allowing for adjustment of the fishing line to a variety of depths without having to reel in the fishing line.

A second objective is to provide the device with a magnetic catch means to hold and release the line traveling through the magnetic catch means.

A third objective is to provide the device with a means to engage and disengage the magnetic catch with a light tug on the fishing line from the shore by the fisherman.

DESCRIPTION OF THE DRAWINGS

The following drawings are submitted with this utility patent application.

DESCRIPTION OF THE PREFERRED EMBODIMENT

Figure 1:
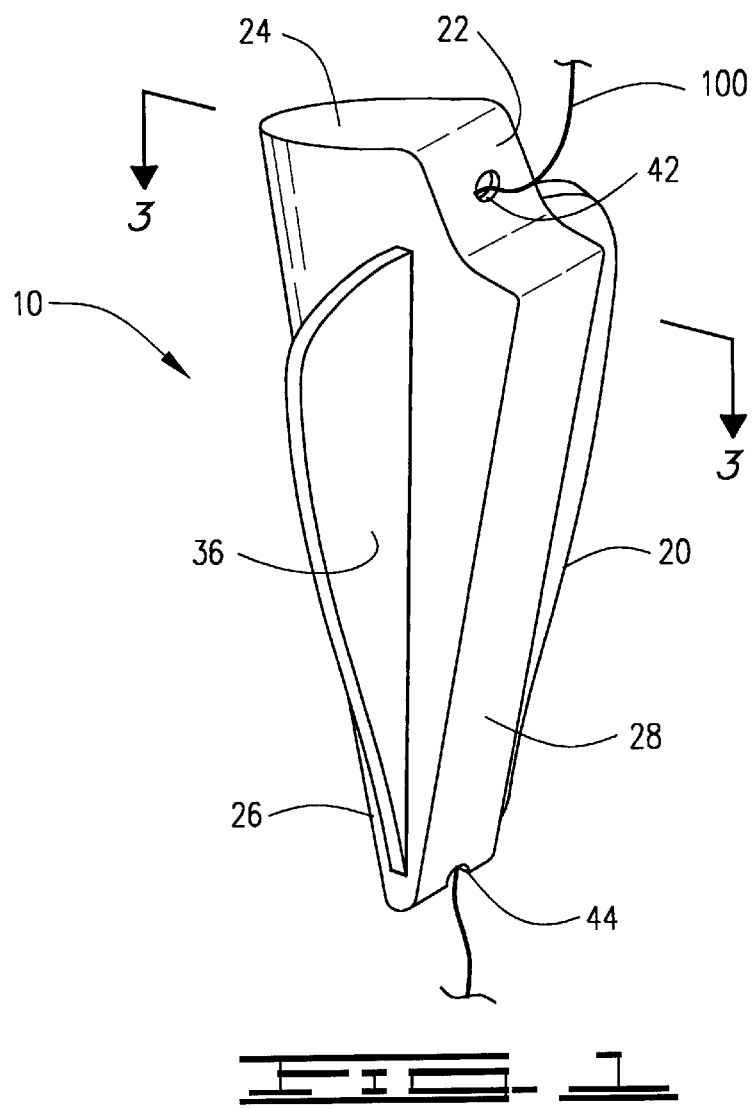
FIG. 1 is a perspective view of the invention.

The invention, as shown in FIGS. 1–6 of the drawings, is a fishing float 10 attached to a fishing line 100 providing adjustment of the depth of the fishing line without having to necessarily reel in the fishing line to perform the adjustment manually, the fishing float 10 comprising a buoyant wedge-shaped outer shell 20, an internal fishing line channel 40 running through the fishing float 10, a weighted metal rocker arm 50 pivotally attached within the outer shell 20, the metal rocker arm 50 having an internal inertia activated non-magnetic metal ball 72 contained within a ball track 70 forcing the rocker arm 50 to pivot when a tug is applied to the rocker arm 50, the rocker arm 50 also having a magnetic catch tip 62 encroaching within the internal fishing line channel 40 adapted to lockingly engage a stationary magnetic catch receiver 60 across the internal fishing line channel 40 until a tugging force applied to the fishing line 100 disengages the magnetic catch tip 62 from the magnetic catch receiver 60.

Figure 2:
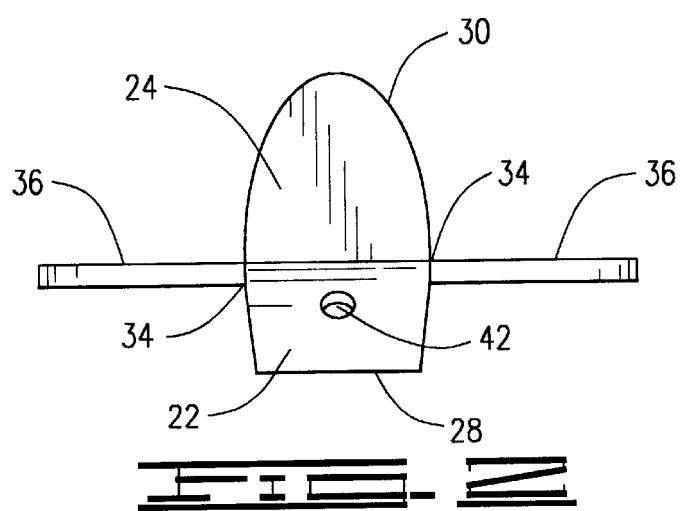
FIG. 2 is a top view of the invention.

The buoyant wedge-shaped outer shell 20, as shown in FIGS. 1 and 2 of the drawings, has an angled upper front surface 22 and a flattened upper rear surface 24, a tapering lower portion 26, a flat front surface 28, a rounded rear surface 30, an interior cavity 32 and two side surfaces 34 having extending lateral fins 36. The angled upper front surface 22 has a fishing line entry port 42 and the tapering lower portion 26 includes a fishing line exit port 44, the line entry port 42 and the line exit port 44 defining the internal fishing line channel 40.

Figure 3:
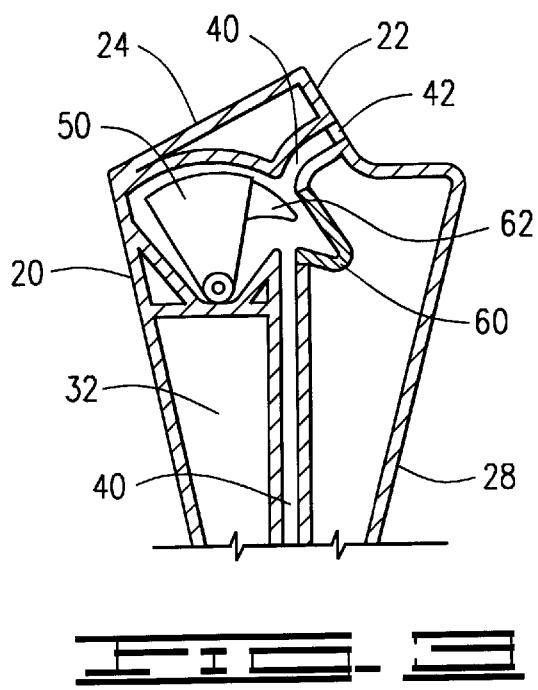
FIG. 3 is a side cross-sectional view of the invention.
Figure 4:
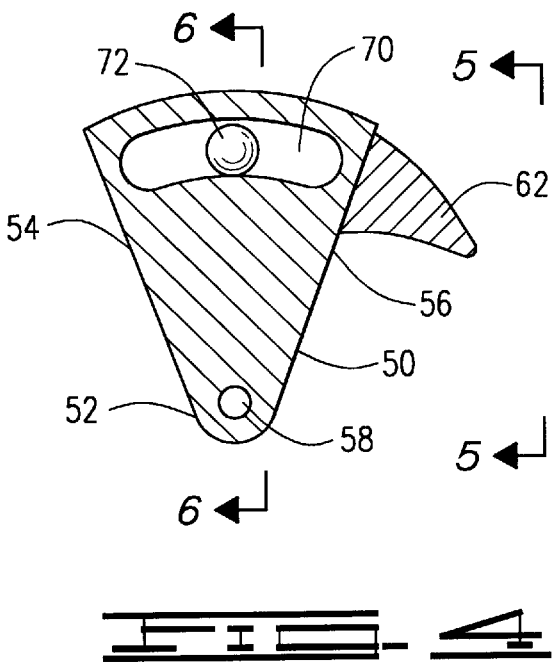
FIG. 4 is a side cross-sectional view of the lock wedge.
Figure 5:
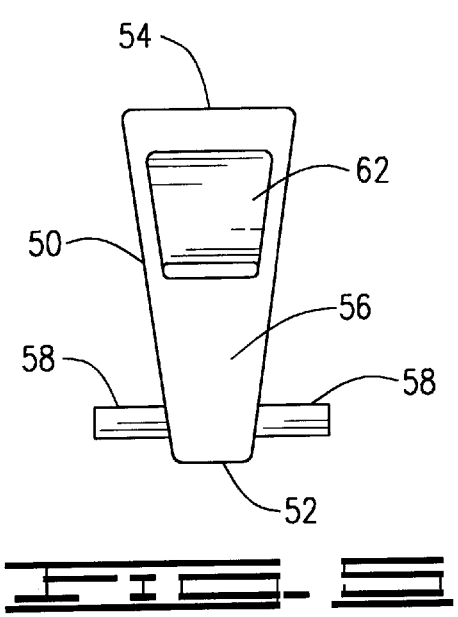
FIG. 5 is a front view of the lock wedge.
Figure 6:
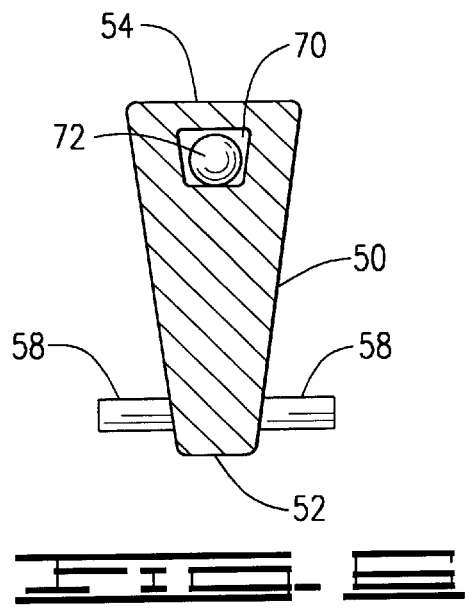
FIG. 6 is a front cross-sectional view of the lock wedge.

The weighted metal rocker arm 50 is pivotally attached to the interior cavity 32 of the outer shell 20 adjacent to the internal fishing line channel 40 most preferably close to the line entry port 42, as shown in FIG. 3 of the drawings. This rocker arm 50 also has an overall flat wedge shape, including a narrow base portion 52 and a flared upper portion 54, as shown in FIGS. 4–6, with pivot arms 58 extending from the base portion 52 into the interior cavity 32 of the outer shell 20 causing the rocker arm 50 to partially rotate and pivot in a direction perpendicular to the pivot arms 58. The ball track ad 70 containing the non-magnetic metal ball 72 is located within the flared upper portion 54, the ball track 70 channeled within the flared upper portion 54 in the same direction as the pivotal rotation of the rocker arm 50. The magnetic catch tip 62 extends from a front surface 56 of the flared upper portion 54, thus giving the rocker arm 50 the appearance of a bird's head, as shown in FIG. 4 of the drawings. The non-magnetic ball 72 is free to roll within the ball track 70, providing the rocker arm 50 with a variable balanced weight, with the non-magnetic ball 72 inside the rocker arm 50 driving the rocker arm 50 away from or towards the front surface 56, thus driving the magnetic catch tip 62 towards or away from the magnetic catch receiver 70 positioned within the internal fishing line channel 40.

The magnetic catch tip 62 and the magnetic catch receiver 60 trap the fishing line 100 running through the internal fishing line channel 40 when the magnetic catch tip 62 and magnetic catch receiver 60 are engaged. A light upward tug of the fishing line should disengage the magnetic catch tip 62 and magnetic catch receiver 60 allowing for a free flow of the fishing line within the internal fishing line channel 40. A second light tug on the fishing line forces the fishing float 10 in a direction towards the front flat surface 28 causing the non-magnetic ball 72 within the rocker arm 50 to move forward, driving the magnetic catch tip 62 towards the magnetic catch receiver 60, again holding the fishing line 100 between the magnetic catch tip 62 and magnetic catch receiver 60. This repeated release and engagement allows a fisherman to adjust the depth of bait attached to the fishing 100 line running through this fishing float 10 to multiple depths without having to reel in the fishing line to make manual adjustments.

While the invention has been particularly shown and described with reference to a preferred embodiment thereof, it will be understood by those skilled in the art that changes in form and detail may be made therein without departing from the spirit and scope of the invention.

What is claimed is:

1. A fishing float attached to a fishing line providing adjustment of the depth of the fishing line without having to necessarily reel in the fishing line to perform the adjustment manually, the fishing float comprising:

a buoyant wedge-shaped outer shell;

an internal fishing line channel running through the fishing float through which the fishing is directed;

a stationary magnetic catch receiver: and a weighted metal rocker arm pivotally attached within the outer shell, the metal rocker arm containing an internal inertia driven non-magnetic metal ball contained within a ball track forcing the rocker arm to pivot when a tug is applied to the rocker arm, the rocker arm also having a magnetic catch tip encroaching within the internal fishing line channel adapted to lockingly engage the stationary magnetic catch receiver across the internal fishing line channel until a tugging force applied to the fishing line disengages the magnetic catch tip from the magnetic catch receiver.

2. The fishing float, as claimed in claim 1, further comprising:

the outer shell having an angled upper front surface and a flattened upper rear surface, a tapering lower portion, a flat front surface, a rounded rear surface, an interior cavity and two side surfaces having extending lateral fins with the angled upper front surface including a fishing line entry port and the tapering lower portion including a fishing line exit port, said line entry port and line exit port defining the internal fishing line channel.

3. The fishing float, as claimed in claim 2, further comprising:

the weighted metal rocker arm is pivotally attached to the interior cavity of the outer shell adjacent to the internal fishing line channel close to the line entry port, said rocker arm having an overall flat wedge shape, the rocker arm further comprising:

a narrow base portion with a pair of pivot arms extending from the base portion into the interior cavity of the outer shell causing the rocker arm to partially rotate and pivot in a direction perpendicular to the pivot arms; and a flared upper portion incorporating the ball track containing the non-magnetic metal ball, said ball track channeled within the flared upper portion in the same direction as the rotation of the rocker arm, the flared upper portion also including a front surface from which the magnetic catch tip extends, wherein the non-magnetic ball may freely roll within the ball track, providing the rocker arm with a variable balanced weight, the inertial force of the non-magnetic ball inside the rocker arm driving the rocker arm away from or towards the front surface, advancing the magnetic catch tip towards or away from the magnetic catch receiver positioned within the internal fishing line channel.

* * * * *